(12) United States Patent
Morioka (10) Patent No.: US 10,237,751 B2
(45) Date of Patent: *Mar. 19, 2019

(54) COMMUNICATIONS DEVICE

(71) Applicant: SONY CORPORATION, Tokyo (JP)

(72) Inventor: Yuichi Morioka, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/952,398

(22) Filed: Apr. 13, 2018

(65) Prior Publication Data

US 2018/0234857 A1    Aug. 16, 2018

Related U.S. Application Data

(63) Continuation of application No. 15/110,526, filed as application No. PCT/EP2014/076784 on Dec. 5, 2014, now Pat. No. 9,973,937.

(30) Foreign Application Priority Data

Jan. 15, 2014  (EP) .................................... 14151346

(51) Int. Cl.
*H04W 16/14*    (2009.01)
*H04W 72/12*    (2009.01)
(Continued)

(52) U.S. Cl.
CPC ............. *H04W 16/14* (2013.01); *H04L 69/22* (2013.01); *H04W 24/10* (2013.01); *H04W 28/04* (2013.01);
(Continued)

(58) Field of Classification Search
CPC . H04W 72/1205; H04W 76/00; H04W 76/02; H04W 76/022; H04W 76/025;
(Continued)

(56) References Cited

U.S. PATENT DOCUMENTS

2007/0002890 A1    1/2007  Mangold et al.
2011/0090880 A1    4/2011  Abraham
(Continued)

FOREIGN PATENT DOCUMENTS

WO    2004/100468 A1    11/2004
WO    2012/005460 A2    1/2012
(Continued)

OTHER PUBLICATIONS

International Search Report issued in PCT/EP2014/076784 dated May 15, 2015.

*Primary Examiner* — Ashley Shivers
(74) *Attorney, Agent, or Firm* — Xsensus LLP (57) ABSTRACT

A communications device comprising a transmitter, a receiver and a controller operable to transmit and to receive signals representing data to and from a network element across a first wireless access interface, the first wireless access interface being provided by the network element and access to resources of the first wireless access interface being controlled by the network element. The controller is configured to control the receiver to perform detection of signals transmitted across a second wireless access interface, and to control the transmitter to transmit a reporting message to the network element across the first wireless access interface, the reporting message including an indication of one or more properties of signals that have been detected across the second wireless access interface.

16 Claims, 8 Drawing Sheets

(51) Int. Cl.
    *H04W 48/16*     (2009.01)
    *H04W 88/06*     (2009.01)
    *H04L 29/06*     (2006.01)
    *H04W 24/10*     (2009.01)
    *H04W 74/08*     (2009.01)
    *H04W 76/15*     (2018.01)
    *H04W 76/12*     (2018.01)
    *H04W 76/16*     (2018.01)
    *H04W 28/04*     (2009.01)
    *H04W 84/12*     (2009.01)

(52) U.S. Cl.
    CPC ....... *H04W 48/16* (2013.01); *H04W 72/1205* (2013.01); *H04W 74/085* (2013.01); *H04W 76/12* (2018.02); *H04W 76/15* (2018.02); *H04W 76/16* (2018.02); *H04W 88/06* (2013.01); *H04W 84/12* (2013.01)

(58) Field of Classification Search
    CPC ... H04W 76/027; H04W 76/20; H04W 76/22; H04W 76/25; H04W 76/27; H04W 24/10; H04W 16/14
    See application file for complete search history.

(56) References Cited

U.S. PATENT DOCUMENTS

| | | |
|---|---|---|
| 2011/0268101 A1 | 11/2011 | Wang et al. |
| 2013/0122951 A1 | 5/2013 | Kim et al. |
| 2013/0195096 A1 | 8/2013 | Kim et al. |
| 2013/0336156 A1 | 12/2013 | Wei et al. |
| 2013/0344883 A1 | 12/2013 | Rinne et al. |
| 2014/0010089 A1 | 1/2014 | Cai et al. |
| 2014/0036889 A1 | 2/2014 | Kim et al. |
| 2014/0043979 A1* | 2/2014 | Etemad ................... H04W 4/70 370/237 |
| 2014/0044105 A1 | 2/2014 | Bontu et al. |
| 2015/0156635 A1 | 6/2015 | Liang et al. |
| 2015/0195849 A1 | 7/2015 | Bashar et al. |
| 2016/0295477 A1* | 10/2016 | Zhu ....................... H04W 36/14 |

FOREIGN PATENT DOCUMENTS

| | | |
|---|---|---|
| WO | 2012/116489 A1 | 9/2012 |
| WO | 2012/123616 A1 | 9/2012 |

* cited by examiner

COMMUNICATIONS DEVICE

CROSS-REFERENCE TO RELATED
APPLICATIONS

The present application is a continuation of U.S. application Ser. No. 15/110,526, filed on Jul. 8, 2016, which is a National Phase application based on International Application No. PCT/EP2014/076784, filed on Dec. 5, 2014, and claims priority to European Patent Application No. 14151346.5, filed in the European Patent Office on Jan. 15, 2014, the entire contents of which are incorporated herein by reference.

FIELD OF THE DISCLOSURE

The present disclosure relates to the wireless telecommunications systems and in particular communications devices, network elements, communications systems and methods for performing remote signal detection.

BACKGROUND OF THE DISCLOSURE

Third as well as fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection. The demand to deploy fourth generation networks is therefore strong and the coverage area of these networks, i.e. geographic locations where access to the networks is possible, is expected to increase rapidly. However, although the coverage and capacity of fourth generation networks is expected significantly exceed those of previous generations of communications networks, there are still limitations on both the network capacity and the geographical areas than can be served by such networks. These limitations may for example be particularly relevant in situations where networks are experiencing high load and high-data rate communications. Although the licensed frequency spectrum available to mobile communications system may increase and therefore allows for capacity to be increased further, future growth in demand may lead to insufficient licensed frequency spectrum being available to provide sufficient capacity to meet demand. As a consequence of this limited spectrum, the use of unlicensed portions of the frequency spectrum has been proposed for LTE systems, where the additional frequency spectrum may be used to supplement the licensed spectrum available and therefore increase the capacity of LTE systems. However, in contrast to licensed portions of the frequency spectrum, unlicensed portions may be used by a broad range of systems which may both cause interference but also be susceptible to interference.

SUMMARY OF THE DISCLOSURE

In accordance with one example the present disclosure there is provided a communications device comprising a transmitter, a receiver and a controller operable to transmit and to receive signals representing data to and from a network element across a first wireless access interface operating according to a first wireless telecommunications standard, the first wireless access interface being provided by the network element and access to resources of the first wireless access interface being controlled by the network element. The controller is configured to control the receiver to perform detection of signals transmitted across a second wireless access interface operating according to a second wireless telecommunications standard which is different to the first wireless telecommunications standard, and to control the transmitter to transmit a reporting message to the network element across the first wireless access interface, the reporting message including an indication of one or more properties of signals that have been detected across the second wireless access interface.

Detecting signals transmitted across a second wireless access interface at a communications device being served by a network element operating according to a first telecommunications standard, and providing an indication of the results of the detection to the network element allows the network element to perform remote signal detection. This therefore enables the network element to acquire knowledge of signals which it may not be able to detect directly because it is out of range but which the communications device may be able to receive. This therefore allows the network element to obtain improved information on signals provided across other wireless access interfaces operating according to other telecommunications standards that are operating within its coverage area compared to sensing the signals directly. With this information on the signals transmitted across a second wireless access interface, the network element may then provide a third wireless access interface positioned around the signals transmitted across the second wireless access interface so that the provision of the third wireless access interface does not interfere with communications across the second wireless access interface. The provision of a third wireless access interface in this manner may include positioning the third wireless access around the signals transmitted with respect to the second wireless interface in both time and or frequency, thus enabling efficient use to be made of the available spectrum.

In another example the signals transmitted across the first wireless access interface are transmitted across a first frequency range and the signals transmitted across the second wireless access interface are transmitted across a second frequency range, the first and second frequency ranges being substantially mutually exclusive.

The detection of signals over a frequency range different to that that the communications device and the network element are communicating over enables the network element to establish unoccupied frequencies in a previously unknown frequency range. These unoccupied frequencies may then be used to provide increased capacity via the provision a further wireless access interface in addition to the first wireless access interference without interfering with the signals transmitted across the second wireless access interface.

In another example the controller is configured to control the receiver to receive a sensing request message from the network element, the sensing request message providing an indication of the second frequency range, and to control the receiver to perform the detection of signals transmitted across the second wireless access interface using the second frequency range in response to receiving the sensing request message.

The use of a sensing request messages allows the network entity to initiate the signal detection when it may wish to establish a third wireless access interface in order to provide additional capacity for communications devices.

In another example the receiver is operable to perform the detection of signals transmitted across the second wireless access interface in accordance with one or more of a plurality of detection techniques, each of the plurality of detection techniques having a different level of sensitivity to the signals transmitted across the second wireless access interface.

This feature allows the technique used for signal detection to be selected based on the capabilities of the communications device performing the detection and the sensitivity of the signal detection required. This may for example allow the complexity of communications devices to be reduced and in some examples the power consumption to also be reduced when relatively low sensitivity signal detection is required.

In another example the controller is configured to control the transmitter to transmit to the network element an indication of one of more of the plurality of detection techniques the receiver can perform.

In another example one of the detection techniques includes detection of the energy present in the second frequency range.

In another example wherein the signals transmitted across the second wireless access interface represent one or more packets, each packet including a preamble portion, a header portion and a data portion, and one of the detection techniques includes detection of the preamble portion.

In another example the signals transmitted across the second wireless access interface represent one or more packets, each packet including a preamble portion, a header portion and a data portion, and one of the detection techniques includes detection of the preamble portion and detection and estimation of the data of the header portion.

In another example wherein the signals transmitted across the second wireless access interface represent one or more packets comprising data, each packet including a preamble portion, a header portion and a data portion, and one of the detection techniques includes detection of the preamble portion, detection and estimation of data of the header portion, and detection and estimation of data of the data portion.

The provision of different signal detection techniques allows a technique appropriate to the communications device's capabilities and the information required by the network element to be selected. For instance, energy detection may be used at a relatively simple communications device whereas full detection and estimation of packets may be used at a fully capable communications device such as a smart phone. Furthermore, the use of different signal detection techniques also allows the provision of a third wireless access interface by the network element to be performed with a higher degree of adaptability and therefore efficiency. For example by obtaining the header information the duration of the packet may be known and the third wireless access interface may be provided around the packet thus increasing the efficiency of the use of the available spectrum.

In another example the data portion includes collision avoidance information, and the controller is configured to perform virtual carrier sensing of the second wireless access interface based upon the collision avoidance information and provide an indication of the virtual carrier sending in the reporting message.

In another example the second frequency range includes frequencies from an unlicensed portion of the radio frequency electromagnetic spectrum.

In another example the second wireless access interface operates according to one or more of the IEEE 802.11 standards.

In another example the first wireless access interface operates in according to a 3GPP LTE standard.

In another example the properties of the detected signals includes one or more of temporal properties and power spectral density properties.

Specifying that the second wireless access interface operates in accordance with IEEE 802.11 ensures that the provision of a third wireless access interface by the network element over the second frequency range will result in little or no interference with IEEE 802.11 systems. Furthermore, the use of an unlicensed spectrum to provide an additional wireless access interface by a LTE operable network element allows the capacity of LTE system to be increased without increasing the requirement of licensed spectrum, thus reducing the cost of providing extra capacity in LTE systems.

Various further aspects and embodiments of the disclosure are provided in the appended claims, including but not limited to network elements, wireless communications systems and methods of the performing remote signal detection.

BRIEF DESCRIPTION OF THE DRAWINGS

Embodiments of the present disclosure will now be described by way of example only with reference to the accompanying drawing in which like parts are provided with corresponding reference numerals and in which.

DETAILED DESCRIPTION OF EXAMPLE EMBODIMENTS

Conventional Communications System

Figure 1:
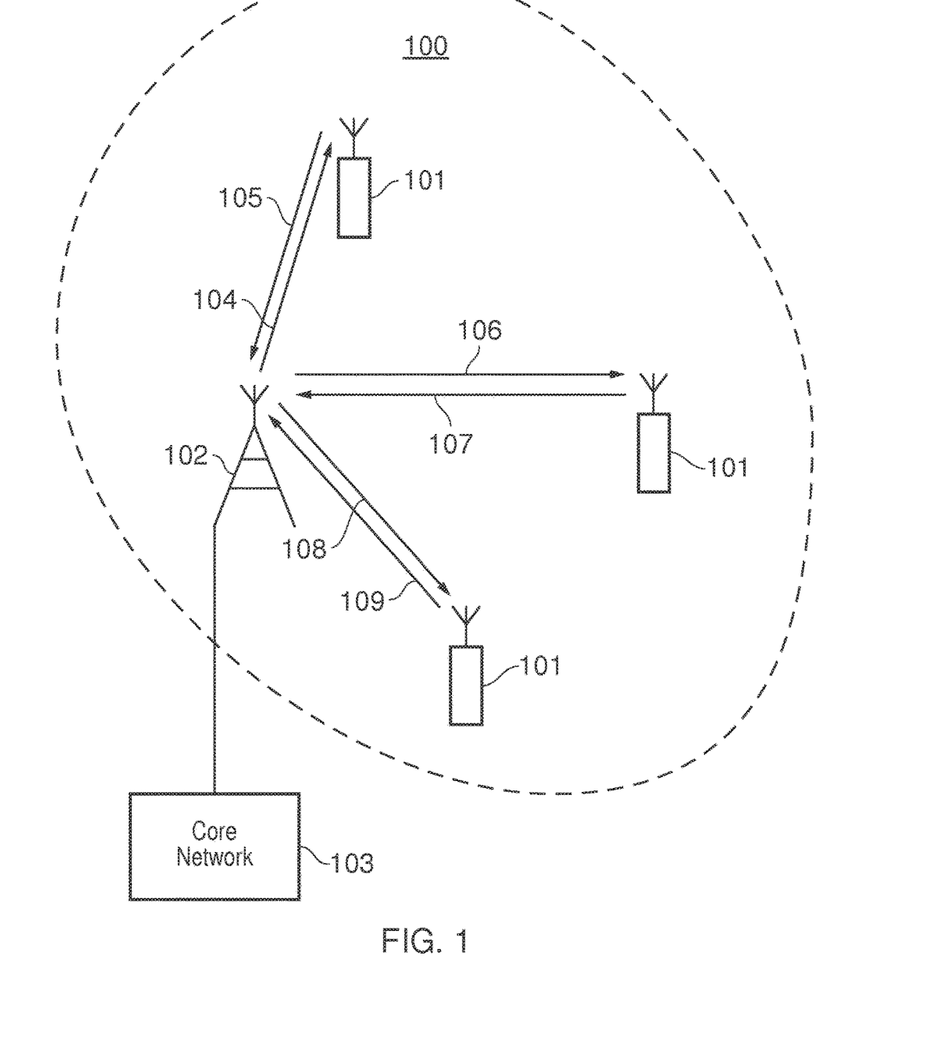
FIG. 1 provides a schematic diagram of a wireless communications system.

FIG. 1 provides a schematic diagram of a conventional mobile communications system 100, where the system includes mobile communications devices 101, infrastructure equipment 102 and a core network 103. The infrastructure equipment may also be referred to as a base station, network element, enhanced node B (eNodeB) or a coordinating entity for example and provides a wireless access interface to the one or more communications devices within a coverage area or cell, and over which the one or more mobile communications devices may communicate data. The network element is communicatively linked to the core network 103 where the core network is connected to one or more other communications networks and may also provide functionality including authentication, mobility management, charging and so on for the communications devices served by the network entity. The mobile communications devices may also be referred to as communications terminals or user equipment (UE) and are configured to communicate with one or more other communications devices via the network entity by transmitting and receiving data via the wireless access interface over the two way communications links represented by lines 104 to 109, where 104, 106 and 108 represent downlink communications from the network entity to the communications devices and 105, 107 and 109 represent the uplink communications from the communications devices to the network entity. The communications system 100 may operate in accordance with any known protocol, for instance in some examples the system 100 may operate in accordance with the 3GPP Long Term Evolution (LTE) telecommunications standard and in which the network element and communications devices are commonly referred to as eNodeB and UEs respectively.

Figure 2:
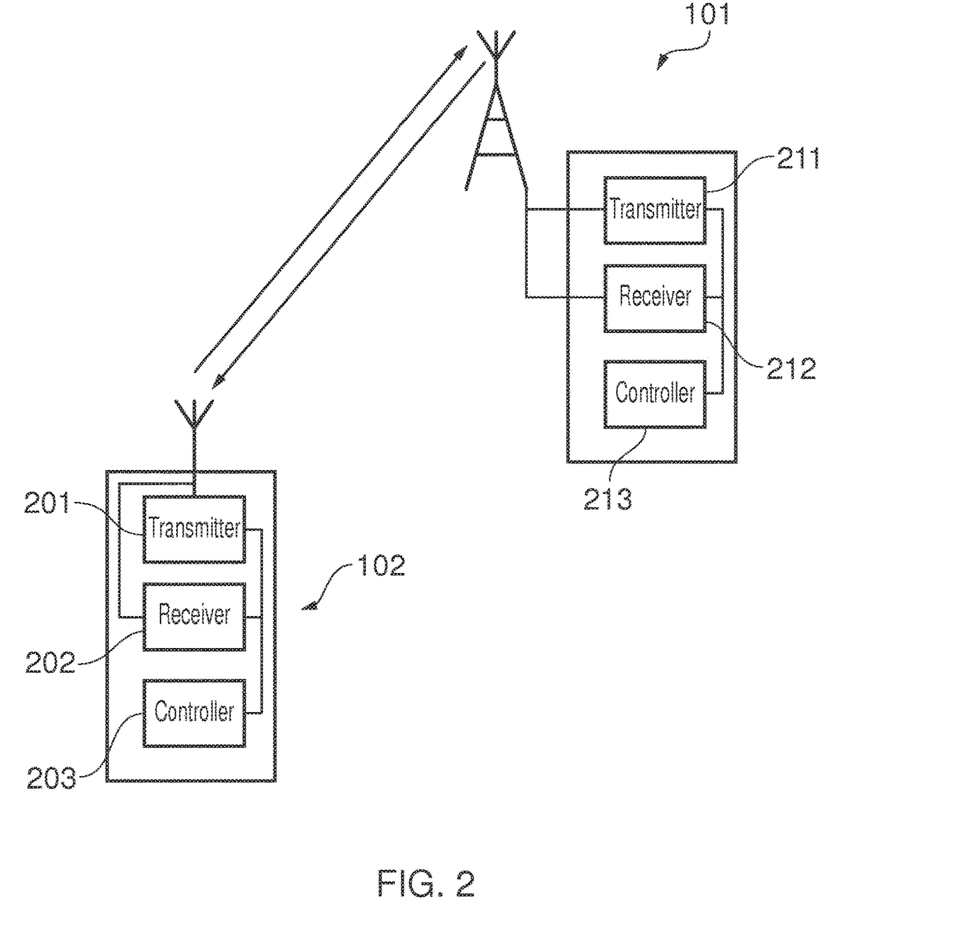
FIG. 2 provides a schematic diagram of a communications device and a network element of a wireless communications system.

FIG. 2 provides a schematic diagram of examples UEs 101 and an eNodeB 102. The UE includes a transmitter 201, a receiver 202 and a controller 203 where the controller is configured to control the receiver 202 to detect signals representing control data and user data transmitted by the eNodeB 210, and to estimate the data conveyed by these signals. In some examples the control may also be operable to control the receiver 202 to detect to detect signals transmitted by other wireless communications systems over other wireless access interfaces. The controller 203 is also configured to control the transmitter 201 to transmit signals representing uplink control data and user data to the eNodeB. The eNodeB 210 includes a transmitter 211, a receiver 212 and a controller 213, where the controller 213 is configured to control the transmitter 211 to transmit signals representing control data and user data to UEs within a coverage area such as the UE 101, thus providing a wireless access interface to UEs within the coverage area. The controller 213 is also configured to control the receiver 213 to detect signals representing user control and uplink data and estimate the data conveyed by these signals.

The electromagnetic spectrum and in particular the radio frequency portion over which wireless systems such as that illustrated in FIG. 1 operate is a scarce resource and therefore its use is commonly controlled by an official government organisation. As a result of this, if a communications network operator wishes to have exclusive use of a particular portion of the spectrum or a range of frequencies they are required to obtain a license to the portion by paying for its use. Such a process of licensing is commonly performed via an auction or via a direct decision of the official organisation in control of spectrum allocation. For example, in the UK portions of the frequency spectrum around 900 MHz, 1800 MHz and 2.1 GHz are allocated to mobile telecommunications for second, third and fourth generation networks where each frequency portion may be further divided into separate allocations for different network operators each of which pays for the use of their allocation. Although the use of licensed spectrum reduces the likelihood of experiencing interference because the operator may have exclusive use of it and thus may lead to improved system performance, by virtue of the cost of licensed spectrum and the limited quantity of it, capacity limitations may arise from the use of licensed spectrum alone. Systems that operate in accordance with the LTE standard(s) have conventionally operated in licensed portions of the spectrum but the desire for additional capacity has led to the use of unlicensed radio frequency spectrum for LTE systems being proposed. Systems which are capable of LTE operation over unlicensed radio frequencies may be referred to as LTE-U systems and the unlicensed spectrum may be used to provide stand alone LTE carriers or carriers which act as additional carriers for carrier aggregation for example Communications System Operation in Unlicensed Spectrum Unlicensed portions of the frequency spectrum consist of frequencies over which no one has exclusive use but instead any device may use, possibly subject to power emission limitations and or methods of behaviour. For instance, the 2.4 GHz to 2.5 GHz range is specified as an industrial, scientific and medical (ISM) band where devices such as microwaves and communications systems such as WiFi operate (IEEE 802.11 telecommunications standard). A second ISM band also exists at 5.725 GHz to 5.875 GHz in which WiFi may also operate. In order to ensure that the ISM bands remain usable for wireless communications certain behavioural rules may be implemented. For example, if a high level of interference is experienced at a particular frequency by a device attempting to transmit, the device is required to reduce its transmission power or transfer to another frequency rather than increase the transmission power as may occur in a licensed band. Such operation is commonly referred as the politeness principle and reduces the likelihood that transmission powers of devices increase via a positive feedback loop until little or no communications can be achieved over the associated frequencies.

Due to the unknown nature of the users of the unlicensed bands such as the 2.4 GHz and 5.8 GHz ISM bands, if LTE systems are to use these frequencies a method of determining the signals or interference present on the frequencies of interest within the ISM band are required. Furthermore, it is likely that a condition of LTE-U operation is that it does not interfere with other communications systems utilising the ISM bands such as WiFi for example. Consequently, the operation of LTE-U is dependent on both establishing a hole(s) in the unlicensed spectrum in which a wireless access interface can be provided but also ensuring that any LTE-U transmissions do not cause significant interference to co-existing systems utilising the unlicensed frequency band. The operation of LTE-U is currently in the early stages of development and has therefore yet to be determined, consequently there are a number of different possible modes of operation. For example, an eNodeB may provide an LTE based wireless access interface concurrently on both licensed and unlicensed spectrum where control signalling is restricted to transmission over the resources of the licensed bandwidth such that the wireless access interface of the unlicensed band simply acts to provide additional data capacity. In this case downlink control information specific to resource allocation in the unlicensed frequencies may be transmitted over the licensed frequencies. Alternatively, the wireless access interfaces of the licensed and unlicensed band may be run as independent systems where both control and user data are communicated over both the licensed and unlicensed frequencies. Lastly, LTE-U may operate without a corresponding conventional LTE network running on licensed bandwidth so that an LTE wireless access interface is fully provided over an unlicensed frequency band. However, regardless of the exact operation of the LTE and LTE-U systems there is a common requirement that free resources in the unlicensed spectrum be identified for LTE-U to operate.

Figure 3:
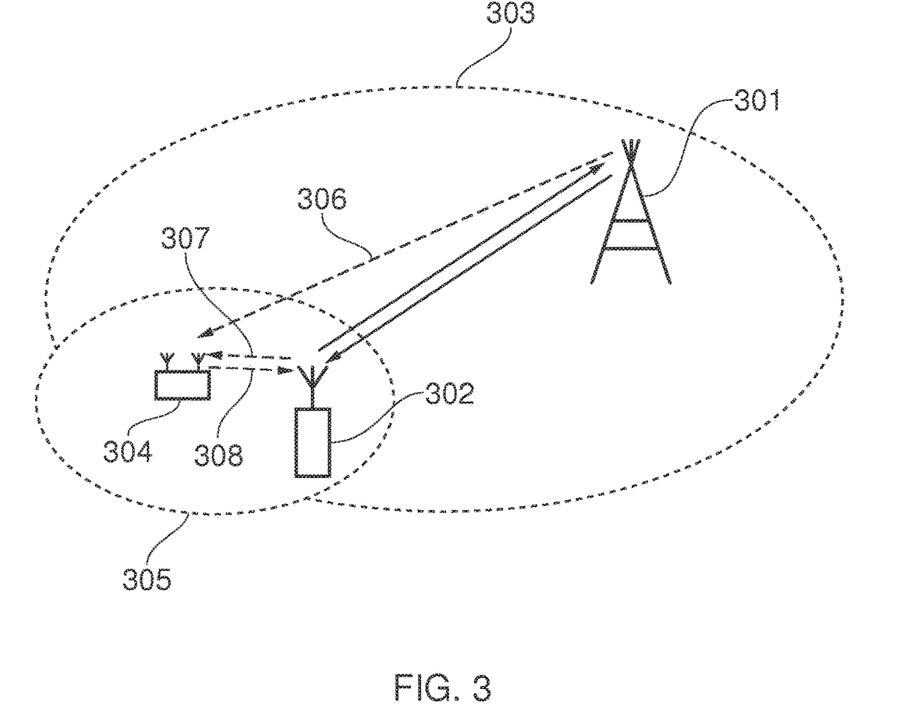
FIG. 3 provides a schematic diagram of a first and a second wireless communications systems with overlapping coverage areas.

FIG. 3 provides a schematic diagram of an LTE system that includes an eNodeB 301 which provides an LTE wireless access interface to the UEs such as UE 302 that are within the coverage area 303. Also in FIG. 3 a WiFi router is present which provides a wireless access interface in accordance with any of the IEEE 802.11 standards to devices within the coverage area 305. Conventionally the LTE wireless access interface will be provided over licensed spectrum or frequency range and the WiFi wireless access interface will be provided over unlicensed spectrum or frequency range such as the 2.4 GHz and 5.8 GHz bands. In such conventional circumstances the two systems will coexist with little or no interference with one another due to their separation in frequency. However, if the eNodeB wishes to perform LTE-U operation over the unlicensed frequency band a number of problems regarding the WiFi system may occur. Firstly, if the eNodeB wishes to provide a wireless access interface in an unlicensed band without causing interference to the WiFi system or experiencing interference from the WiFi system, it is necessary that the eNodeB has knowledge of spectrum/frequency range(s) that the WiFi system is utilising. With such knowledge the eNodeB may then identify candidate frequencies and times for the provision of a further or third wireless access interface and thus position the third wireless access interface around the WiFi signals in both time and or frequency. When the eNodeB is within the coverage area of a WiFi network the eNodeB may detect signals from the WiFi system directly and therefore provide an LTE wireless access interface around the detected WiFi signals. However, as is shown in FIG. 3 the coverage area of a WiFi system is likely to be smaller than that provided by an eNodeB, consequently, it can not be guaranteed that an eNodeB can detect WiFi signals that will be within range of served UEs. Consequently, eNodeB transmissions performed without knowledge the WiFi system's spectrum transmissions may interfere with and receive interference from the WiFi system. In FIG. 3, interference resulting from signals transmitted by the WiFi and LTE systems are represented by dashed lines where transmissions 306 and 307 represents interference from the LTE system towards the WiFi system and transmission 308 represent interference from the WiFi system to the LTE system and in particular the interference caused by WiFi signals at the UE.

In addition to the scenario depicted in FIG. 3, an LTE system may also wish to provide a third wireless access interface via the use of a femto eNodeB. For example a femto eNodeB with a reduced coverage area compared to eNodeB 303 may be positioned in the vicinity of UE 302. In such an example, user plane data may be communicated via the femto eNodeB across an unlicensed band and control plane data still may be transmitted direct to a macro eNodeB across the licensed band. In order for the implementation of such an arrangement, the macro eNodeB will once again require knowledge of the use of the unlicensed spectrum by the WiFi system in both time and frequency such that the likelihood of interference can be reduced. Once this information is known the eNodeB may configure the femto eNodeB to provide the third wireless access interface around the WiFI signals.

Figure 4A:
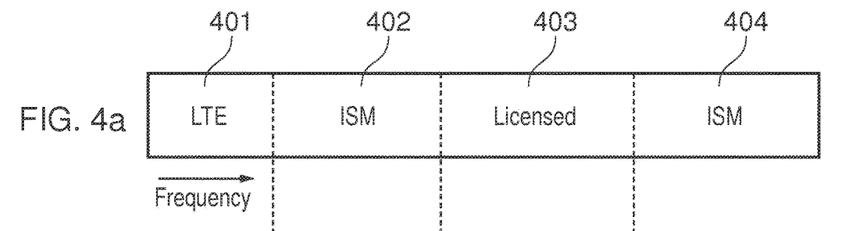
FIGS. 4a to 4c provides a schematic diagram of example licensed and unlicensed portions of the electromagnetic spectrum.

FIG. 4a provides a schematic diagram of an example portion of the electromagnetic radio frequency spectrum where there is a frequency bandwidth 401 licensed to an LTE system (first bandwidth), an ISM unlicensed frequency band 402, a frequency band 403 licensed to a third party and a second ISM unlicensed frequency band 404. A conventional LTE system may operates in 401 but in an LTE-U system an eNodeB may also try to establish an LTE wireless access interface in one or more of 402 and 404 (second bandwidth).

Figure 4B:
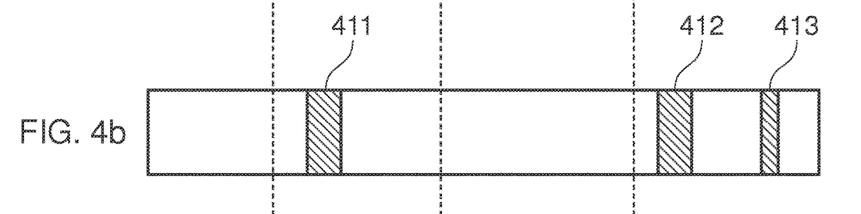

FIG. 4b provides corresponding diagram of the example portion of spectrum of FIG. 4a but additionally shows signals 411 to 413 which are present in the ISM bands and may be signals providing a WiFi wireless access interface for example. If an eNodeB is to establish an LTE-U wireless access interface in the ISM bands it is desirable that the LTE-U signals do not overlap with the signals 411 to 413 in the frequency domain.

Figure 4C:
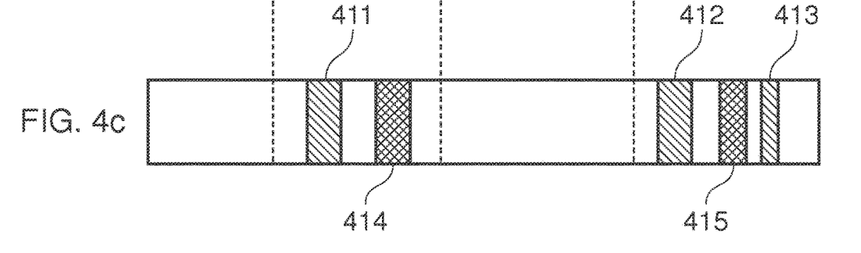

FIG. 4c provides corresponding diagram of the example portion of spectrum of FIG. 4b where LTE signals 414 and 415 providing an LTE wireless access interface have been positioned in the unlicensed frequency spectrum between the signals 411 to 413. Consequently, LTE-U can operate without receiving interference from or causing interference to the system from which the signals 411 to 413 originate.

In order to achieve the resource utilisation depicted in FIG. 4c it is required that the eNodeB is provided within an indication of signals in the unlicensed spectrum in the vicinity of a UE. Although up to this point and in the remainder of the disclosure, WiFi is given as an example of the interference other communications systems such as ultra-wideband (UWB) and ISM devices may also be the interferer and the interferee. However, due to the potential competing nature of WiFi and LTE-U it is important that these two systems do not adversely affect the operation of each other and therefore shall be used as an example co-spectrum user for the remainder of the disclosure.

Spectrum Sensing

In accordance with the present disclosure a UE with which an eNodeB wishes to communicate via unlicensed spectrum is operable to provide an indication of WiFi signals which it can detect such that the eNodeB is provided with time and frequency information on WiFi signals that it may not be able to detect directly. This process may be referred to as remote signal detection or remote carrier sensing. Referring back to FIG. 3, eNodeB 301 or a femto eNodeB may wish to provide a wireless access interface and a corresponding connection with UE 302 over the 5.8 GHz ISM bandwidth over which the WiFi router 304 is also operating. Consequently, the eNodeB requires an indication of the frequencies and possibly their use in time over which the WiFi router is providing its wireless access interface. Consequently it is necessary that a candidate UE provides the information because the eNodeB may be out of range of a relevant WiFi transmitter.

Figure 5:
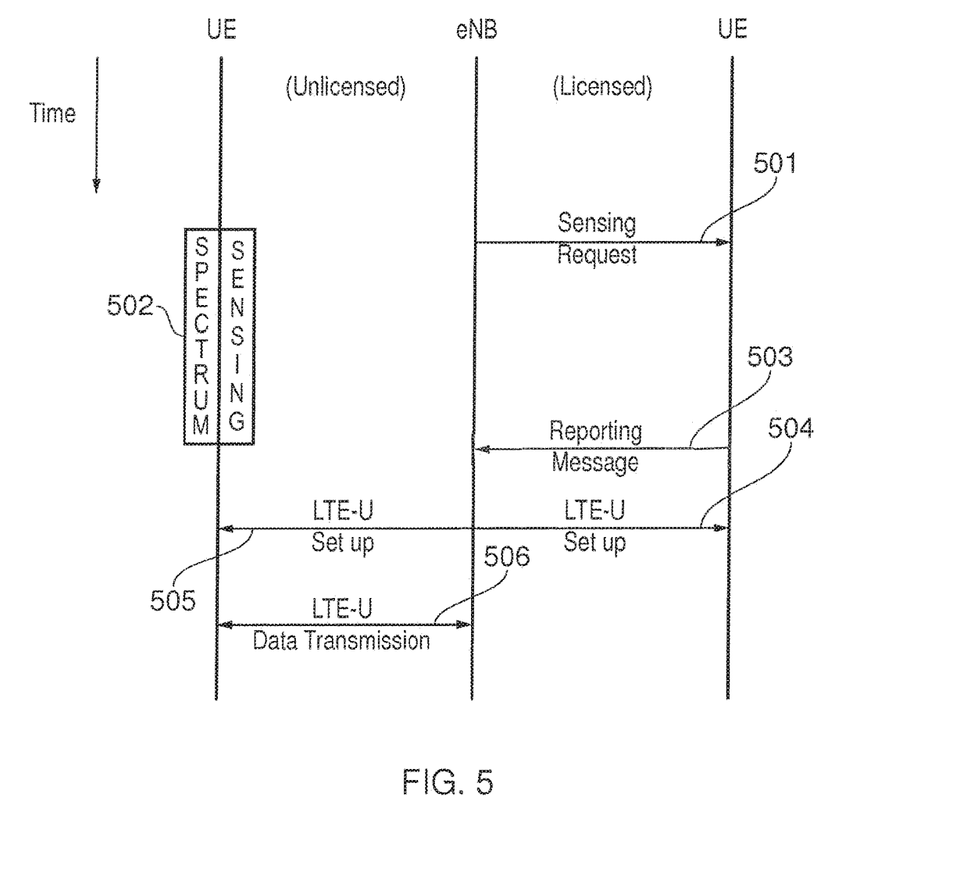
FIG. 5 provides a schematic diagram of a message exchange between a network element and a communications device performing remote signal detection.

FIG. 5 provide a diagram of the messages that may be exchanged between an eNodeB and a UE when the eNodeB wishes to establish an LTE wireless access interface in an unlicensed frequency band when there in an existing connection between the UE and eNodeB. In FIG. 5 the left-hand column represents communications between the eNodeB and the UE over the unlicensed spectrum i.e. the LTE-U or third wireless access interface, and the right column represents communications between the eNodeB and the UE over the licensed spectrum via the conventional LTE wireless access interface. Firstly, presuming that the eNodeB already has a connection with the UE via a licensed portion of the spectrum, the eNodeB may send a spectrum sensing request message 501 to the UE, where the message may provide one or more of an indication of the candidate frequencies over which the eNodeB wishes to establish an LTE-U wireless access interface and the type of system whose signals the UE should detect for example. In some examples an indication of the candidate frequencies and the type of system may predetermined and known at the UE and therefore not require specification in the sensing request message. In response to receiving the spectrum sensing request message, the UE begins the process of detecting WiFi signals and other signals on the candidate frequencies, a process which is referred to as spectrum sensing 502 in FIG. 5. Once the detection process has been completed the UE may then provide an indication of the signals and or the properties of the signals that it has detected in the candidate frequencies to the eNodeB in a reporting message 503, thus completing the remote spectrum sensing or remote signal detection process. As well as frequency domain information, the reporting message may also provide information on the power of any signals that have been detected and any time domain information available. Based on the reporting message the eNodeB may then establish a LTE-U wireless access interface in the free portions of the unlicensed spectrum via the transmission of control messages 504 and 505. The establishment of the LTE-U wireless access interface may be performed via both the conventional LTE wireless access interface and the LTE-U wireless access interface depending on the control structure implemented for the LTE-U wireless access interface. For example, in some examples user plane data may be transmitted across the wireless access interface provided across the unlicensed frequency band with most or all control data being transmitted across the licensed frequency band. Once the LTE-U wireless access interface has been established, user data 506 may then be communicated across it. Although in FIG. 5 spectrum sensing and the establishment of a third wireless access interface has been described with reference to a single eNodeB, a third wireless access interface may also be provided in association in a macro eNodeB and femto eNodeB. For example, the spectrum sending and wireless access interface set may be performed using the sensing request message 501, the reporting message 503 and the LTE-U setup message 504 via the macro eNodeB without transmissions over the unlicensed band i.e. message 505. Once the wireless access interface is setup, the data transmission may then be performed over the unlicensed frequency band via a femto eNodeB as opposed to a macro eNodeB.

The spectrum sensing operation may be performed in accordance with one or more of a plurality of techniques, each of which may have a different sensitivity to WiFi signals or other signals, where complex techniques may provide more detailed information on spectrum usage and therefore allow more efficient use of the available unlicensed spectrum. The technique to be used may be determined by the capabilities of the sensing UE or 'sensitivity level', or in some examples may be specified in the sensing request message and thus be determined by the eNodeB requesting the spectrum sensing. In circumstances where the detection technique is determined in accordance with the capabilities of the sensing UE, the UE may provide an indication of its level of sensitivity to the eNodeB via a transmission on the licensed band. Such an indication may in some examples be provided when a UE first enters the coverage area of an eNodeB, in response to sensing request or in response to an explicit sensitivity level request from the serving eNodeB.

A most basic approach to spectrum sensing is to detect power spectral density or the energy present on each of the candidate frequencies. This approach may be achieved by simple energy detection on the candidate frequencies by the receiver of the UE. In some examples as well as the energy level detected, the UE may also report any time variation in the energy levels. The time domain information may for example be used to position the signals providing an LTE-U wireless access interface both in the frequency and time domains, possible via a time and frequency hopping technique. The detection of energy on candidate frequencies enables the UE to detect signals from both communications systems such as WiFi but also interference from other sources such as microwaves for example. However, although sensing interference in this manner has a low complexity it does not provide information on the nature of the interference or any information on the potential future behaviour of the interference which may be used by the eNodeB to pre-emptively avoid interface.

As an alternative or as well as detecting the energy of signals in the candidate frequencies, further information may be obtained from the detected signals by analysing data that may be represented by the signals. For example, by detecting the various properties of a WiFi packet further information about WiFi signals may be obtained.

Figure 6:
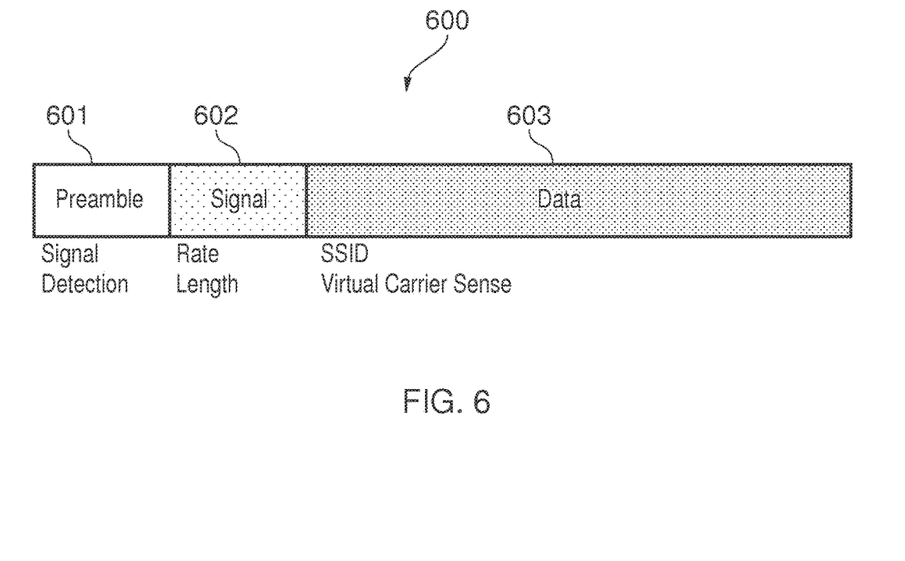
FIG. 6 provides a schematic diagram of IEEE 802.11 packet.

FIG. 6 provide a schematic diagram of an example IEEE 802.11 WiFi packet 600 where the packet is formed from a preamble 601, a signalling portion of physical (PHY) header 602 and a data portion 603. Each of these portions of the packet 600 provides different information on the properties of the WiFi signals. For example the preamble provides an indication that it is a WiFi packet, the PHY header provides information on the coding of the data within the packet and the duration of the packet and the data itself may provide information on future packets as well as the user data of the current packet.

In a second spectrum sensing approach the UE is configured to detect the preamble of WiFi packets so that as well as establishing the frequency and time domain behaviour of the signals the type of signals e.g. WiFi may be established. WiFi packets have a common preamble structure and therefore a simple matched filter may be used to detect WiFi signals on the candidate frequencies. As well as providing an indication that the interference is WiFi, by detecting WiFi packet preambles, the probability of detecting a WiFi signals may be increased compared to energy detection alone. However, although an improvement in terms of detection compared to energy detection, preamble detection still does not provide an indication of the likely behaviour of the interference outside of the spectrum sensing period and thus may still be view as a reactionary technique as opposed to a proactive detection technique.

A third approach to spectrum sensing is to detect and decode the signalling or PHY header portion of WiFi packets. Although this will require actual detection and estimation of the data conveyed by the PHY header, such information includes the length of the packet, modulation scheme and coding rate thus allowing the eNodeB to schedule LTE-U transmission around the WiFi packets in a proactive manner and therefore increase the efficiency with which available spectrum is used. This approach to interference/WiFi detection represents an improvement over the second approach in terms of performance as it provides information on the behaviour of the signal outside of the sensing period but requires additional resources in order to decode the header. Although additional resources are required at the UE, by virtue of the fact that the PHY header is modulated with binary phase shift keying (BPSK) for all releases of the IEEE 802.11 standard, the UE will be able to decode all PHY regardless of the IEEE 802.11 release the WiFi packets was transmitted in accordance with.

Figure 7:
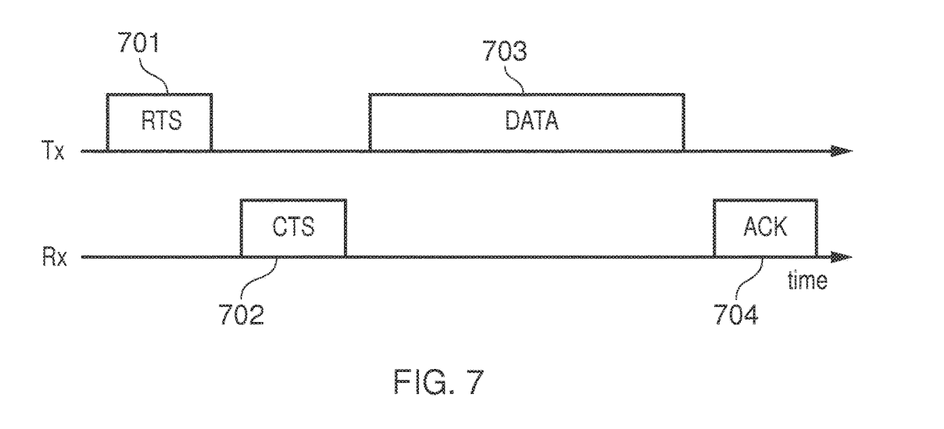
FIG. 7 provides a schematic diagram of a message exchange in virtual carrier sensing routine.

A fourth approach to spectrum sensing of WiFi signals incorporates virtual carrier sensing where the UE processes entire detected WiFi packets including the data portion such that it can establish all properties associated with the packets. In such an approach the UE will be required to have WiFi baseband capabilities and be fully WiFi operable so that all data can be detected and estimation. For example, the UE may have to be operable to decode WiFi signals transmitted in accordance with any of the IEEE 802.11 releases modulated using any of the available modulation schemes such as BPSK, quadrature phase shift keying (QPSK), 16 quadrature amplitude modulation and 64 QAM for example. However, in exchange for this increasingly complex spectrum sensing, by virtue of being operable to fully decode WiFi packets the UE may also be able to decode beacon and control packets which provide information on system configurations and request to send (RTS) and clear to send (CTS) message, respectively. Beacon packets sent by a WiFi router may contain synchronisation information and capability information on the WiFi router, thus providing the UE and eNodeB with further information on the behaviour of the WiFi wireless access interface and signals in both frequency and time. RTS and CTS messages are exchanged in WiFi systems for virtual carrier sensing and may provide an indication of the length of future packets and therefore the period of time that a data exchange will take to conclude. Once the UE has reported an indication of this information back to the eNodeB the eNodeB may then schedule transmission accordingly to the temporal information included in the RTS and CTS messages. The additional information provided by the detection and estimation of beacon and RTS and CTS packets may in turn assist with optimising the positioning of a LTE wireless access interface in an unlicensed band and increase the efficiency with which resources of the unlicensed band are used with respect to the preceding three spectrum sensing techniques FIG. 7 provides a schematic diagram of a WiFi message exchange where RTS and CTS messages are utilised to establish the occupancy of the frequency channels across which the WiFi wireless access interface is provided. A transmitting entity firstly sends a RTS message 701 to the intended recipient, where the RTS message indicates the length of the intended transmission. When sufficient resources of the wireless access interface are available the intended recipient will then transmit a CTS message 702 to the transmitter indicating among other things how long the wireless access interface will be available for. Once received at the transmitter, the transmitter will transmit the data 703 and the receiver will acknowledge the successful reception of the data via an acknowledgement 704. By this process of virtual carrier sensing, third parties may avoid collisions with transmissions from other transmitting nodes which it can not directly detect because they are out of range. This situation is commonly referred to as the hidden node scenario and is depicted in FIG. 8.

Figure 8:
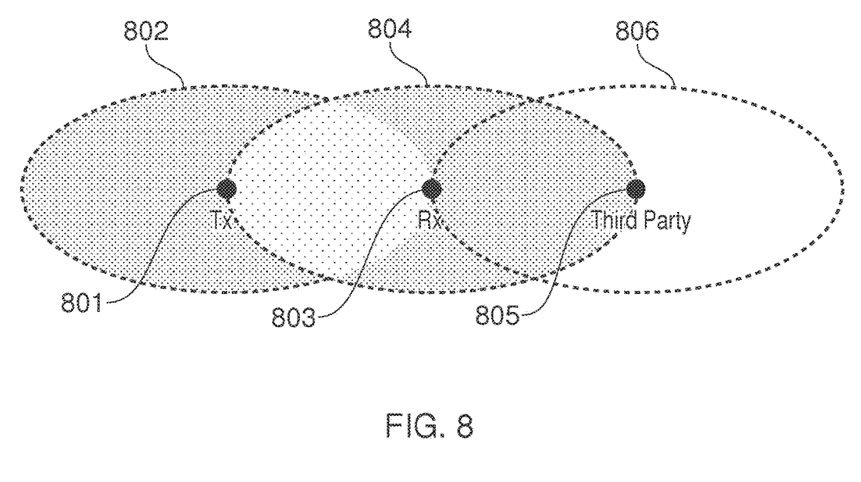
FIG. 8 provides a schematic diagram of overlapping coverage areas of transmitting, receiving communications device and a third party communications device.

In FIG. 8 the transmitting node 801 has a coverage area of 802, the receiving node 803 has a coverage area of 804 and the third party node 805 has a coverage area of 806. As a result of these coverage areas the transmitting node and the third part node area are unaware of each other's existence and therefore in scenarios where virtual carrier sensing is not in operation, they may transmit concurrently to the receiving node and therefore interfere with each other. However, by requiring a CTS message prior to transmission the third party will hold its transmission thus avoiding a potential collision between transmissions. An LTE UE such as the third party in FIG. 8 may in some circumstances be considered to be the hidden node and therefore only be able to receive transmissions from the receiving node. Consequently, by virtue of decoding the entirety of WiFi packets and performing virtual carrier sensing, once an indication of the CTS packets has been received at the eNodeB, the LTE-U wireless access interface can be position a wireless access interface around transmissions from the transmitting node so that interference is not experienced at the receiving node even though the transmitting node is out of range of both the eNodeB and the UE.

The above described remote signal detection or remote carrier sensing may be performed prior to the establishment of a LTE-U wireless access interface in an unlicensed frequency band but it may also be performed periodically in order that an up to date frequency map of user of the unlicensed frequency band is maintained at the eNodeB. The various remote carrier sensing techniques described above represent a progressive trade-off between performance and complexity and therefore each technique may be selected based on the resource at the UE, the expected interference in the unlicensed frequency band or the resource of the unlicensed frequency band required to provide the LTE-U wireless access interface. For example, a non-WiFi capable UE may only conduct energy detection where as a fully functional smart phone required a high data-rate connection may perform full WiFi packet detection and estimation so that the LTE-U wireless access interface can be optimised around the present and future time and frequency properties of the WiFi signals.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

The following numbered clauses provide further aspects and examples of the present disclosure:

1. A communications device comprising a transmitter, a receiver and a controller operable to transmit and to receive signals representing data to and from a network element across a first wireless access interface operating according to a first wireless telecommunications standard, the first wireless access interface being provided by the network element and access to resources of the first wireless access interface being controlled by the network element, wherein the controller is configured
   to control the receiver to perform detection of signals transmitted across a second wireless access interface operating according to a second wireless telecommunications standard which is different to the first wireless telecommunications standard, and
   to control the transmitter to transmit a reporting message to the network element across the first wireless access interface, the reporting message including an indication of one or more properties of signals that have been detected across the second wireless access interface.

2. A communications device according to clause 1, wherein the signals transmitted across the first wireless access interface are transmitted across a first frequency range and the signals transmitted across the second wireless access interface are transmitted across a second frequency range, the first and second frequency ranges being substantially mutually exclusive.

3. A communications device according to clause 2, wherein the controller is configured to control the receiver to receive a sensing request message from the network element, the sensing request message providing an indication of the second frequency range, and to control the receiver to perform the detection of signals transmitted across the second wireless access interface using the second frequency range in response to receiving the sensing request message.

4. A communications device according to clauses 2 or 3, wherein the receiver is operable to perform the detection of signals transmitted across the second wireless access interface in accordance with one or more of a plurality of detection techniques, each of the plurality of detection techniques having a different level of sensitivity to the signals transmitted across the second wireless access interface.

5. A communications device according to clause 4, wherein one of the detection techniques includes detection of the energy present in the second frequency range.

6. A communications device according to clause 4, wherein the signals transmitted across the second wireless access interface represent one or more packets, each packet including a preamble portion, a header portion and a data portion, and one of the detection techniques includes detection of the preamble portion.

7. A communications device according to clause 4, wherein the signals transmitted across the second wireless access interface represent one or more packets, each packet including a preamble portion, a header portion and a data portion, and one of the detection techniques includes detection of the preamble portion and detection and estimation of the data of the header portion.

8. A communications device according to clause 4, wherein the signals transmitted across the second wireless access interface represent one or more packets comprising data, each packet including a preamble portion, a header portion and a data portion, and one of the detection techniques includes detection of the preamble portion, detection and estimation of data of the header portion, and detection and estimation of data of the data portion.

9. A communications device according to any of clauses 4 to 8, wherein the controller is configured to control the transmitter to transmit to the network element an indication of one of more of the plurality of detection techniques the receiver can perform.

10. A communications device according to clause 8, wherein the data portion includes collision avoidance information, and the controller is configured to perform virtual carrier sensing of the second wireless access interface based upon the collision avoidance information and provide an indication of the virtual carrier sensing in the reporting message.

11. A communications device according to any of clauses 2 to 10, wherein the second frequency range includes frequencies from an unlicensed portion of the radio frequency electromagnetic spectrum 12. A communications device according to any preceding clause, wherein the second wireless access interface operates according with one or more of the IEEE 802.11 standards.

13. A communications device according to any preceding clause, wherein the first wireless access interface operates according to a 3GPP LTE standard.

14. A communications device according to any preceding clause, wherein the properties of the detected signals include one or more of temporal properties and power spectral density properties.

15. A network element comprising a transmitter, a receiver and a controller operable to provide a first wireless access interface operating according to a first wireless telecommunications standard to a communications device and transmit and receive signals representing data to and from the communications device across the first wireless access interface, access to the first wireless access interface being controlled by the network element, wherein the controller is configured to control the transmitter to transmit a sensing request message to the communications device, the sensing request message providing an indication of a second wireless access interface that operates according to a second wireless telecommunications standard which is different to the first wireless telecommunications standard and a request for the communications device to detect signals transmitted across the second wireless access interface, and to control the receiver to receive a reporting message from the communications device, the reporting message providing an indication of one or more properties of signals detected by the communications device across the second wireless access interface.

16. A network element according to clause 15, wherein the signals transmitted across the first wireless access interface are transmitted across a first frequency range and the signals transmitted across the second wireless access interface are transmitted across a second frequency range, the first and second frequency ranges being substantially mutually exclusive.

17. A network element according to clause 16, wherein control the sensing request message includes an indication of the second frequency range.

18. A network element according to clause 16, wherein the detection of signals transmitted across the second wireless access interface is performed in accordance with one of a plurality of detection techniques, each of the plurality of detection techniques having a different level of sensitivity to the signals transmitted across the second wireless access interface.

19. A network element according to clause 18, wherein the controller is configured to control the receiver to receive from the communications device an indication of one of more of the plurality of detection techniques the communications device is operable to perform.

20. A network element according to any of clauses 16 to 19, wherein the controller is configured to control the transmitter and the receiver to provide a third wireless access interface in response to receiving the reporting message, the third wireless access interface being provided in portions of the second frequency range indicated by the reporting message as having a substantial absence of signals transmitted across the second wireless access interface.

21. A network element according to any of clauses 16 to 20, wherein the second frequency range includes frequencies from an unlicensed portion of the radio frequency electromagnetic spectrum.

22. A network element according to any of clauses 15 to 21, wherein the second wireless access interface operates according to one or more of the IEEE 802.11 standards.

23. A network element according to any of clauses 15 to 22, wherein the first wireless access interface operates according to a 3GPP LTE standard.

24. A wireless communications system comprising a network element and a communications device, the network element comprising a transmitter, a receiver and a controller operable to provide a first wireless access interface operating according to a first wireless telecommunications standard to the communications device, control access to the first wireless access interface and to transmit and to receive signals representing data to and from the communications device, the communications device comprising a transmitter, a receiver and a controller operable to transmit and receive signals representing data to and from the network element, wherein the controller of the network element is configured to control the transmitter of the network element to transmit a sensing request message to the communications device, the sensing request message providing an indication of a second wireless access interface that operates according to a second wireless telecommunications standard which is different to the first wireless telecommunications standard and a request for the communications device to detect signals transmitted across the second wireless access interface, and to control the receiver to receive a reporting message from the communications device, the reporting message providing an indication of one or more properties of signals detected by the communications device across the second wireless access interface, and the controller of the communications device is configured to control the receiver of the communications device to receive the sensing request message and in response to perform detection of signals transmitted across a second wireless access interface, and to control the transmitter of the communications device to transmit the reporting message to the network element.

25. A method for remote signal detection at a communications device, the communications device being operable to transmit and to receive signals representing data to and from a network element across a first wireless access interface operating according to a first wireless telecommunications standard, the first wireless access interface being provided by the network element and access to resources of the first wireless access interface being controlled by the network element, wherein the method includes performing detection of signals transmitted across a second wireless access interface at the communications device, the second wireless access interface operating according to a second wireless telecommunications standard which is different to the first wireless telecommunications standard and transmitting a reporting message to the network element from the communications device across the first wireless access interface, the reporting message including an indication of one or more properties of signals that have been detected across the second wireless access interface.

26. A method for remote signal detection from a network element, the network element being operable to provide a first wireless access interface operating according to a first wireless telecommunications standard to a communications device and transmit and receive signals representing data to and from the communications device across the first wireless access interface, access to the first wireless access interface being controlled by the network element, wherein the method includes transmitting a sensing request message to the communications device from the network element, the sensing request message providing an indication of a second wireless access interface operating according to a second wireless telecommunications standard which is different to the first wireless telecommunications standard and a request for the communications device to detect signals transmitted across the second wireless access interface, and receiving at the network element a reporting message from the communications device, the reporting message providing an indication of one or more properties of signals detected by the communications device across the second wireless access interface.

27. A method for remote signal detection in a wireless communications system, the system comprising a network element operable to provide a first wireless access interface operating according to a first wireless telecommunications standard to a communications device, control access to the first wireless access interface and to transmit and to receive signals representing data to and from the communications device, the communications device being operable to transmit and receive signals representing data to and from the network element, the method including transmitting a sensing request message to the communications device from the network element, the sensing request message providing an indication of a second wireless access interface operating according to a second wireless telecommunications standard which is different to the first wireless telecommunications standard and a request for the communications device to detect signals transmitted across the second wireless access interface, performing detection of signals transmitted across a second wireless access interface at the communications device in response to receiving the sensing request message, and transmitting a reporting message from the communications device to the network element, the reporting message providing an indication of one or more properties of signals detected by the communications device across the second wireless access interface.

28. A communications device as substantially hereinbefore described with reference to the accompanying drawings.

29. A network element as substantially hereinbefore described with reference to the accompanying drawings.

30. A communications system as substantially hereinbefore described with reference to the accompanying drawings.

The invention claimed is:

1. A communications device comprising a transmitter, a receiver and a controller configured to transmit and to receive signals representing data to and from a network element across a first wireless access interface operating according to a first wireless telecommunications standard for a wide area network (WAN), the first wireless access interface being provided by the network element and access to resources of the first wireless access interface being controlled by the network element, wherein the controller is configured to:
control the receiver to perform detection of signals transmitted across a second wireless access interface operating according to a second wireless telecommunications standard for a local area network (LAN);
control the transmitter to transmit a reporting message to the network element across the first wireless access interface, the reporting message including an indication of one or more properties of signals that have been detected across the second wireless access interface; and
control the transmitter and receiver to communicate via a third wireless access interface that is provided by the network element in response to the reporting message, the third wireless access interface being provided in portions of a frequency range of the second wireless access interface indicated by the reporting message as having a substantial absence of signals transmitted across the second wireless access interface.

2. The communications device of claim 1, wherein the signals transmitted across the first wireless access interface are transmitted across a first frequency range and the signals transmitted across the second wireless access interface are transmitted across a second frequency range, the first and second frequency ranges being substantially mutually exclusive.

3. The communications device of claim 2, wherein the controller is configured to:
control the receiver to receive a sensing request message from the network element, the sensing request message providing an indication of the second frequency range; and
control the receiver to perform the detection of signals transmitted across the second wireless access interface using the second frequency range in response to receiving the sensing request message.

4. The communications device of claim 2, wherein the receiver is configured to perform the detection of signals transmitted across the second wireless access interface in accordance with one or more of a plurality of detection techniques, each of the plurality of detection techniques having a different level of sensitivity to the signals transmitted across the second wireless access interface.

5. The communications device of claim 4, wherein one of the detection techniques includes detection of the energy present in the second frequency range.

6. The communications device of claim 4, wherein the signals transmitted across the second wireless access interface represent one or more packets, each packet including a preamble portion, a header portion and a data portion, and one of the detection techniques includes detection of the preamble portion.

7. The communications device of claim 4, wherein the signals transmitted across the second wireless access interface represent one or more packets, each packet including a preamble portion, a header portion and a data portion, and one of the detection techniques includes detection of the preamble portion and detection and estimation of the data of the header portion.

8. The communications device of claim 4, wherein the signals transmitted across the second wireless access interface represent one or more packets comprising data, each packet including a preamble portion, a header portion and a data portion, and one of the detection techniques includes detection of the preamble portion, detection and estimation of data of the header portion, and detection and estimation of data of the data portion.

9. The communications device of claim 4, wherein the controller is configured to control the transmitter to transmit to the network element an indication of one of more of the plurality of detection techniques the receiver can perform.

10. The communications device of claim 8, wherein the data portion includes collision avoidance information, and the controller is configured to perform virtual carrier sensing of the second wireless access interface based upon the collision avoidance information and provide an indication of the virtual carrier sensing in the reporting message.

11. The communications device of claim 2, wherein the second frequency range includes frequencies from an unlicensed portion of the radio frequency electromagnetic spectrum.

12. The communications device of claim 1, wherein the second wireless access interface operates according with one or more of the IEEE 802.11 standards.

13. The communications device of claim 1, wherein the first wireless access interface operates according to a 3GPP standard.

14. The communications device of claim 1, wherein the properties of the detected signals include one or more of temporal properties and power spectral density properties.

15. A communications device, comprising:
circuitry configured to
transmit and to receive signals representing data to and from a network element across a first wireless access interface operating according to a first wireless telecommunications standard for a wide area network (WAN), the first wireless access interface being provided by the network element and access to resources of the first wireless access interface being controlled by the network element;
perform detection of signals transmitted across a second wireless access interface operating according to a second wireless telecommunications standard for a local area network (LAN);
transmit a reporting message to the network element across the first wireless access interface, the reporting message including an indication of one or more properties of signals that have been detected across the second wireless access interface; and
communicate via a third wireless access interface that is provided by the network element in response to the reporting message, the third wireless access interface being provided in portions of a frequency range of the second wireless access interface indicated by the reporting message as having a substantial absence of signals transmitted across the second wireless access interface.

16. A method performed by an electronic device, the method comprising:
transmitting and receiving signals representing data to and from a network element across a first wireless access interface operating according to a first wireless telecommunications standard for a wide area network (WAN), the first wireless access interface being provided by the network element and access to resources of the first wireless access interface being controlled by the network element;

detecting signals transmitted across a second wireless access interface operating according to a second wireless telecommunications standard for a local area network (LAN);

transmitting a reporting message to the network element across the first wireless access interface, the reporting message including an indication of one or more properties of signals that have been detected across the second wireless access interface; and communicating via a third wireless access interface that is provided by the network element in response to the reporting message, the third wireless access interface being provided in portions of a frequency range of the second wireless access interface indicated by the reporting message as having a substantial absence of signals transmitted across the second wireless access interface.

* * * * *